Aug. 27, 1935. G. H. LELAND 2,012,687
MOUNTING FOR MOTORS AND THE LIKE
Filed Oct. 16, 1933
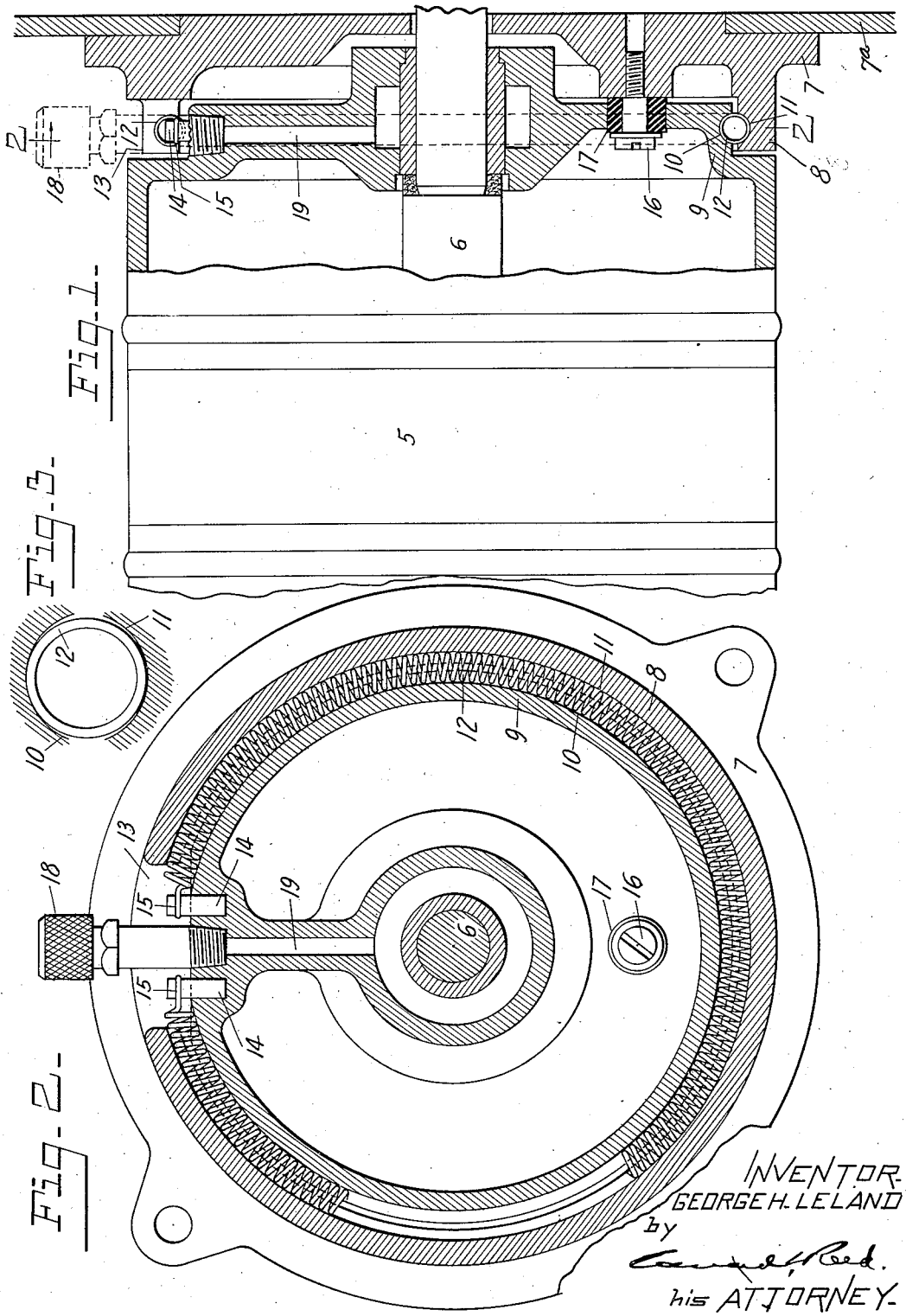
INVENTOR.
GEORGE H. LELAND
by
his ATTORNEY.

Patented Aug. 27, 1935

2,012,687

UNITED STATES PATENT OFFICE 2,012,687

MOUNTING FOR MOTORS AND THE LIKE

George H. Leland, Dayton, Ohio, assignor of one-half to The Leland Electric Company, Dayton, Ohio, a corporation of Ohio Application October 16, 1933, Serial No. 693,781

12 Claims. (Cl. 248—26)

This invention relates to a vibration absorbing mounting for electric motors and the like and is designed more particularly for that type of motor which is mounted wholly at one end.

When a motor frame or casing is rigidly secured to a base or other supporting structure the vibrations which are set up in the frame by the action of the rotor are transmitted to the supporting structure or base and produce a humming noise which is often seriously objectionable, particularly when the motor is a part of a domestic appliance or the like.

One object of the invention is to provide simple and durable means for so mounting the motor frame on the base as to prevent the transmission of vibrations to the base.

A further object of the invention is to so construct the motor frame and base that a vibration absorbing element may be interposed between the same to support the frame out of engagement with the base.

A further object of the invention is to provide a mounting which will prevent any appreciable radial movement of the frame but will yield circumferentially of the frame.

A further object of the invention is to provide a mounting in which the vibration absorbing element will serve to lock the frame to the base.

Other objects of the invention will appear as the apparatus is described in detail.

In the accompanying drawing Fig. 1 is a sectional view of a motor mounting embodying my invention, showing a portion of the motor frame in elevation; Fig. 2 is a transverse section taken on the line 2—2 of Fig. 1 and partially broken away; and Fig. 3 is an enlarged cross sectional view of the vibration absorbing element and portions of its supporting members.

In the drawing I have illustrated one embodiment of the invention but it will be understood that this particular embodiment has been chosen for the purpose of illustration only and that the mounting may take various forms and may be applied to motors or other devices of various kinds.

The motor here shown is of a known construction and comprises a frame or casing 5 in which is rotatably mounted a rotor, the shaft 6 only of the rotor being shown. This motor frame is mounted at one end on a base 7 adapted to be mounted on a suitable supporting structure 7a and the shaft 6 extends through this base. In the particular arrangement which has been selected for the purpose of illustration the motor is supported at one end only and is so mounted on a single supporting member or base that it may be supported thereby in either a vertical position or a horizontal position and will be held against bodily displacement with relation to said supporting member. For this purpose the supporting member is provided with a substantial circular opening or recess to receive a substantially circular exterior portion of the frame having a diameter slightly less than the diameter of the opening, and an elongate vibration absorbing member is interposed between the annular wall of the opening and the frame and so arranged that it will not only absorb torsional vibrations of the frame but will retain said portion of the frame in the opening and hold the same against axial or tilting movement.

In the particular construction here illustrated the base is provided with an annular flange 8 extending toward the motor frame and forming within the same a circular recess which is adapted to receive the end portion of a motor frame. The motor frame is in the present instance provided with an end portion 9 of reduced diameter adapted to extend within the flange 8, thus enabling the exterior surfaces of the flange and of the body of the frame to be arranged substantially flush. The reduced end portion of the frame is circular in form and is of a diameter slightly less than the diameter of the recess formed by the flange. In the form shown the opening or recess in the base is closed at its outer end, except for a shaft opening, and the frame extends only part way through the recess, but it will be obvious that this is immaterial and that the supporting member and its recess may be of any suitable character. The end portion of the frame and the inner surface of the flange 8 are provided with opposed grooves 10 and 11 extending circumferentially thereof and adapted to receive an elongated vibration absorbing element. This vibration absorbing element is of such a character that when mounted in the grooves it will support the motor frame out of engagement with the base and will permit no substantial radial movement of the frame but will yield circumferentially to absorb the circumferential vibrations of the frame. Preferably the vibration absorbing element is of a diameter only slightly less than the width of the grooves so that it will fit snugly within the same and will hold the motor frame against axial movement with relation to the base, thereby preventing the body of the frame from moving into engagement with the outer edge of the flange and preventing the frame from being withdrawn from the recess. Preferably the vibration absorbing element comprises a helical spring 12, the coils of which are of a diameter slightly greater than the combined depth of the grooves 10 and 11, so that when inserted in the grooves the spring will support the motor frame out of engagement with the flange. The coils are of such stiffness transversely that they will have little or no transverse yielding movement and will therefore prevent any substantial radial movement of the frame with relation to the base. The spring fits snugly within the grooves and thus serves to lock the motor frame against axial movement. The coils of the spring may be spaced short distances apart to facilitate the longitudinal yielding of the spring which enables it to absorb the circumferential vibrations of the frame.

In assembling the mounting the reduced end portion of the frame is placed within the flange and supported therein while the spring is inserted lengthwise into the groove, the flange being provided with an opening 13 to permit the spring to be so inserted in the grooves. When the spring has been properly positioned in the grooves the ends thereof are anchored to the frame at points adjacent one to the other. As there shown, pins 14 are mounted in the frame adjacent to the opening 13 of the flange and the ends of the spring are provided with loops or eyes 15 to engage these pins or anchoring devices and hold the spring against longitudinal movement in the grooves. While the ends of the spring might be connected directly one to the other I prefer to anchor them to the frame as above explained because in this manner the spring is held against creeping movement in the grooves and a more satisfactory operation is had. It is desirable that the spring should be confined in grooves under a slight longitudinal tension sufficient to separate the coils thereof and it is therefore of such a character that when contracted it will be of a length slightly less than the circumferential distance between the pins 15. When the spring has been inserted in the grooves the rear end thereof is anchored on one of the pins and the loop at the other or forward end of the spring is engaged by a suitable implement, such as a hook, and the spring stretched to enable said end to be connected with the other pin 14. When the spring is so mounted the coils thereof will have little or no slipping movement in the grooves but the circumferential vibrations of the frame will cause the inner sides of the coils, which are engaged by the frame, to move therewith and to fulcrum about the outer sides of the coils, which are in contact with the flange of the base. This rocking movement of the coils is, of course, resisted by the resiliency of the spring and the spring is thus caused to absorb all or substantially all of the vibrations of the frame and thus prevent those vibrations from being transmitted to the base.

The motor frame is held against rotation with relation to the base by a suitable stop, such as a stud 16, extending through an opening in the end wall of the frame and screw threaded into the base. A sleeve 17 of yieldable material, such as rubber, is mounted on the stud within the opening in the frame to prevent the transmission of vibrations from the frame to the base.

It will be apparent from the foregoing description that the arrangement of the vibration absorbing element or spring is such that the mounting will permit of the rotary or torsional vibrations of the frame but will absorb those vibrations and prevent their transmission to the base. Further, the spring will hold the frame against both axial and radial movement with relation to the base and when the motor is mounted on a horizontal axis will support the frame against tilting movement on the base.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In a mounting for a motor or the like comprising a frame and a rotor mounted therein, a supporting member having a circular recess, said frame having a circular end portion extending into said recess, said portion of said frame and the annular wall of said recess having their adjacent surfaces substantially parallel with the axis of said rotor, said parallel surfaces being provided between their ends with opposed circumferential grooves extending about the same, a vibration absorbing element mounted in said grooves and extending about substantially the entire circumference of said portion of said frame, said wall of said recess having an opening through which said element may be inserted lengthwise into said grooves, and said element being of a thickness greater than the combined depth of said grooves, being substantially unyieldable transversely to its length and being yieldable in the direction of its length.

2. In a mounting for a motor or the like comprising a frame and a rotor mounted therein, a base having a circular recess, said frame having a circular end portion arranged within said recess, said portion of said frame and the wall of said recess having opposed circumferential grooves, a helical spring fitted in said grooves to absorb torsional vibrations and to hold said frame against axial movement with relation to said base, and means for holding said spring against creeping movement in said grooves and for maintaining a longitudinal tension on said spring.

3. In a mounting for a motor or the like comprising a frame and a rotor mounted therein, a base having a circular recess, said frame having a circular end portion arranged within said recess, said portion of said frame and the wall of said recess having opposed circumferential grooves, a helical spring fitted in said grooves to absorb torsional vibrations and to hold said frame against axial movement with relation to said base, anchoring devices mounted adjacent one to the other on said portion of said frame and adapted to engage the respective ends of said spring, said devices being spaced apart a circumferential distance greater than the length of said spring when it is contracted.

4. In a mounting for a motor or the like comprising a frame and a rotor mounted therein, a base having an annular flange, said frame having a circumferential end portion arranged within said flange, said portion of said frame and said flange having opposed circumferential grooves, a helical spring fitted in said grooves to absorb torsional vibrations and to hold said frame against axial movement with relation to said base, said flange having an opening to permit said spring to be inserted lengthwise into said groove, and anchoring devices mounted on said frame adjacent to said opening and connected with the respective ends of said spring.

5. In a mounting for a motor or the like comprising a frame and a rotor mounted therein, said frame having a part to cooperate with a supporting structure, a supporting structure having a part extending about said part of said frame and constituting the sole support therefor, said parts having opposed circumferential grooves, an elongate vibration absorbing element fitting snugly in said grooves and of a thickness slightly greater than the combined depth of said grooves, said vibration absorbing element being longitudinally yieldable to absorb torsional vibrations of said frame and being substantially unyieldable transversely to its length to support said frame out of engagement with said supporting structure and to hold the same against bodily displacement with relation to said supporting structure.

6. In a mounting for a motor or the like comprising a frame and a rotor mounted therein, a supporting member having a circular opening, said frame having a circular exterior portion mounted in said opening and spaced a short distance from the annular wall thereof, said portion of said frame and said annular wall of said opening having their adjacent surfaces substantially parallel with the axis of said rotor, said parallel surfaces being provided between their ends with opposed circumferential grooves extending about the same, an elongate vibration absorbing element mounted in said grooves and extending about substantially the entire circumference of said portion of said frame, said element being of a thickness greater than the combined depth of said grooves and being resiliently yieldable in the direction of its length and substantially non-yieldable transversely to its length, whereby said element will absorb torsional vibrations of said frame and will hold said frame against bodily displacement with relation to said supporting member.

7. In a mounting for a motor or the like comprising a frame and a rotor mounted therein, a supporting member having a circular opening, said frame having a circular exterior portion mounted in said opening and spaced a short distance from the annular wall thereof, said portion of said frame and said annular wall of said opening having their adjacent surfaces substantially parallel with the axis of said rotor, said parallel surfaces being provided between their ends with opposed circumferential grooves extending about the same, an elongate vibration absorbing element mounted in said grooves and extending about substantially the entire circumference of said portion of said frame, said element being of a thickness greater than the combined depth of said grooves and said annular wall having an opening through which said element may be inserted lengthwise into said grooves.

8. In a mounting for a motor or the like comprising a frame and a rotor mounted therein, a supporting member having a circular opening, said frame having a circular exterior portion mounted in said opening and spaced a short distance from the annular wall thereof, said portion of said frame and said annular wall of said opening having their adjacent surfaces substantially parallel with the axis of said rotor, said parallel surfaces being provided between their ends with opposed circumferential grooves extending about the same, an elongate vibration absorbing element mounted in said grooves and extending about substantially the entire circumference of said portion of said frame, said element being of a thickness greater than the combined depth of said grooves and being resiliently yieldable in the direction of its length and substantially non-yieldable transversely to said length, and means for maintaining a longitudinal tension on said element.

9. In a mounting for a motor or the like comprising a frame and a rotor therein, a supporting member having an annular portion substantially concentric with the axis of said rotor, said frame having a circular exterior portion extending into the annular portion of said supporting member, said portion of said frame and said annular portion of said supporting member being spaced a short distance apart and having opposed circumferential grooves, an elongate vibration absorbing element mounted in said grooves and extending about substantially the entire circumference of said portion of said frame, said annular portion of said supporting member being provided with an opening through which said element may be inserted into said opposed grooves, and said element being of a thickness greater than the combined depth of said grooves, being substantially non-yieldable transversely to its length and being yieldable in the direction of its length.

10. In a mounting for a motor or the like comprising a frame and a rotor mounted therein, a supporting member having a circular opening, said frame having a circular exterior portion mounted in said opening and spaced a short distance from the annular wall thereof, said portion of said frame and said annular wall of said opening having their adjacent surfaces substantially parallel to the axis of said rotor, said parallel surfaces being provided between their ends with opposed circumferential grooves approximately semi-circular in cross section, and a helical spring mounted in said grooves, said spring being of a diameter slightly greater than the combined depth of said grooves to support said portion of said frame out of engagement with said annular wall of said opening.

11. In a mounting for a motor or the like comprising a frame and a rotor mounted therein, a supporting member having a circular opening, said frame having a circular exterior portion mounted in said opening and spaced a short distance from the annular wall thereof, said portion of said frame and said annular wall of said opening having their adjacent surfaces substantially parallel to the axis of said rotor, said parallel surfaces being provided between their ends with opposed circumferential grooves approximately semi-circular in cross section, a helical spring mounted in said grooves, said spring being of a diameter slightly greater than the combined depth of said grooves to support said portion of said frame out of engagement with said annular wall of said opening, and means for connecting said spring to one of said grooved parts to prevent the same from creeping.

12. In a mounting for a motor or the like comprising a frame and a rotor mounted in said frame for rotation about a substantially horizontal axis, an upright supporting structure connected with one end only of said frame and constituting the sole support therefor, said supporting structure having an opening and said frame having a part extending into said opening, the wall of said opening and said part of said frame having opposed grooves, and a vibration absorbing element mounted in said grooves, said element being yieldable in the direction of its length and substantially non-yieldable transversely to its length and being seated snugly in said grooves to retain said part of said frame in said recess and to hold said frame against axial or tilting movement with relation to said supporting structure.

GEORGE H. LELAND.